(12) United States Patent
Shi et al.

(10) Patent No.: US 8,953,664 B2
(45) Date of Patent: Feb. 10, 2015

(54) METHOD, EQUIPMENT, SYSTEM, AND PROGRAM PRODUCT FOR ACTIVATING DSL

(71) Applicant: Huawei Technologies Co., Ltd., Shenzhen, Guangdong (CN)

(72) Inventors: Cao Shi, Shenzhen (CN); Zhong Pan, Shenzhen (CN); Jie Lv, Shenzhen (CN); Shicai Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/909,770

(22) Filed: Jun. 4, 2013

(65) Prior Publication Data

US 2013/0322502 A1 Dec. 5, 2013

Related U.S. Application Data

(63) Continuation of application No. PCT/CN2012/076364, filed on May 31, 2012.

(51) Int. Cl.
*H04B 1/38* (2006.01)
*H04M 11/06* (2006.01)

(52) U.S. Cl.
CPC ............ *H04M 11/06* (2013.01); *H04M 11/062* (2013.01)
USPC ..................... 375/222; 379/92.03; 379/92.04; 379/93.01

(58) Field of Classification Search
CPC combination set(s) only.
See application file for complete search history.

(56) References Cited

U.S. PATENT DOCUMENTS

| 2009/0207985 A1 | 8/2009 | Cioffi et al. |
| 2009/0270038 A1* | 10/2009 | Clausen ....................... 455/63.1 |
| 2010/0296663 A1 | 11/2010 | Tkachov et al. |
| 2011/0211468 A1* | 9/2011 | Zhang et al. .................. 370/252 |
| 2012/0082258 A1 | 4/2012 | Nuzman et al. |

FOREIGN PATENT DOCUMENTS

| CN | 101461253 A | 6/2009 |
| CN | 101924964 A | 12/2010 |

OTHER PUBLICATIONS

Oksman et al., "The ITU-T's New G.vector Standard Proliferates 100 Mb/s DSL," IEEE Communications Magazine, pp. 140-148, IEEE, New York, New York (Oct. 2010).

(Continued)

*Primary Examiner* — Adolf Dsouza
(74) *Attorney, Agent, or Firm* — Leydig, Voit & Mayer, Ltd.

(57) ABSTRACT

Embodiments of the present invention provide a method for activating a DSL. The method includes: sending, by a central office equipment, a sync frame period indication message to a customer premises equipment, where a sync frame period indicated by the sync frame period indication message is smaller than a specified sync frame period threshold; receiving a reply message sent by the customer premises equipment in response to the sync frame period indication message, where the reply message indicates whether the customer premises equipment accepts the sync frame period indicated by the sync frame period indication message; and if the reply message indicates that the customer premises equipment accepts the sync frame period, performing, by the central office equipment, vectoring training by using a corresponding sync frame within the sync frame period. The embodiments of the present invention further provide corresponding equipments, a system, and a program product.

12 Claims, 4 Drawing Sheets

(56) References Cited

OTHER PUBLICATIONS

"Series G: Transmission Systems and Media, Digital Systems and Networks: Digital sections and digital line system—Access networks: Very high speed digital subscriber line transceivers 2 (VDSL2)," Feb. 2006, ITU-T Rec. G.993.2, Telecommunication Standardization Sector of International Telecommunication Union, Geneva, Switzerland.

* cited by examiner

METHOD, EQUIPMENT, SYSTEM, AND PROGRAM PRODUCT FOR ACTIVATING DSL

CROSS-REFERENCE TO RELATED APPLICATIONS

This application is a continuation of International Patent Application No. PCT/CN2012/076364, filed on May 31, 2012, which is hereby incorporated by reference in its entirety.

FIELD OF THE INVENTION

The present invention relates to the field of communications, and in particular, to a method, equipment, system, and program product for activating a DSL.

BACKGROUND OF THE INVENTION

DSL (Digital Subscriber Line, digital subscriber line) is a technology for implementing high-speed data transmission over a phone twisted-pair cable.

When a user performs broadband access through a DSL, the user needs to activate the DSL first. During the activation of the DSL, to eliminate crosstalk among DSL lines of different users, it is necessary to perform vectoring (Vectoring) training.

In the existing VDSL2 (Very-high-bit-rate Digital Subscriber line 2, very-high-bit-rate digital subscriber line 2) standard, that is, G.993.2, the time taken for performing vectoring training once is 25.6 seconds, while the time taken for performing DSL activation once is required to be 40 seconds. Therefore, the time for performing vectoring training once takes up 64% of the total DSL activation time, so that the DSL activation time is excessively long, thereby severely affecting the speed for a user to go online and resulting in poor user experience.

An existing method for decreasing the length of an orthogonal sequence borne in a sync frame (sync frame) can shorten the activation time of a user. However, the method may cause a noise problem, for example, crosstalk noise cannot be canceled or additive white Gaussion noise (Additive White Gaussion Noise, AWGN) cannot be effectively eliminated.

SUMMARY OF THE INVENTION

Embodiments of the present invention provide a method, equipment, system, and program product for activating a DSL, capable of shortening vectoring training time without causing a noise problem, thereby achieving the effect of shortening DSL activation time.

In order to achieve the foregoing objectives, the embodiments of the present invention adopt the following technical solutions.

In one aspect of the present invention, a method for activating a DSL is provided, where the method includes:

sending, by a central office equipment, a sync frame period indication message to a customer premises equipment, where the sync frame period indication message indicates a sync frame period, and the sync frame period indicated by the sync frame period indication message is smaller than a specified sync frame period threshold;

receiving, by the central office equipment, a reply message sent by the customer premises equipment in response to the sync frame period indication message, where the reply message indicates whether the customer premises equipment accepts the sync frame period indicated by the sync frame period indication message; and if the reply message indicates that the customer premises equipment accepts the sync frame period, performing, by the central office equipment, vectoring training by using a corresponding sync frame within the sync frame period.

In another aspect of the present invention, a method for activating a DSL is provided, where the method includes:

receiving, by a customer premises equipment, a sync frame period indication message sent by a central office equipment, where the sync frame period indication message indicates a sync frame period, and the sync frame period indicated by the sync frame period indication message is smaller than a specified sync frame period threshold;

determining, by the customer premises equipment, whether to accept the sync frame period indicated by the sync frame period indication message, and sending a reply message to the central office equipment in response to the sync frame period indication message sent by the central office equipment, where the reply message is used to indicate whether the customer premises equipment accepts the sync frame period indicated by the sync frame period indication message; and if the customer premises equipment accepts the sync frame period indicated by the sync frame period indication message, performing, by the customer premises equipment, vectoring training by using a corresponding sync frame within the accepted sync frame period.

In one aspect of the present invention, a DSL central office equipment is provided, where the central office equipment includes:

a sending unit, configured to send a sync frame period indication message to a customer premises equipment, where the sync frame period indication message indicates a sync frame period, and the sync frame period indicated by the sync frame period indication message is smaller than a specified sync frame period threshold;

a receiving unit, configured to receive a reply message sent by the customer premises equipment in response to the sync frame period indication message sent by the sending unit, where the reply message is used to indicate whether the customer premises equipment accepts the sync frame period indicated by the sync frame period indication message; and a training unit, configured to, when the reply message received by the receiving unit indicates that the customer premises equipment accepts the sync frame period, perform vectoring training by using a corresponding sync frame within the sync frame period.

In another aspect of the present invention, a DSL customer premises equipment is provided, where the equipment includes a receiving unit, a processing unit, and a sending unit, and the processing unit includes a determination unit and a training unit, where the receiving unit is configured to receive a sync frame period indication message sent by a central office equipment, where the sync frame period indication message indicates a sync frame period, and the sync frame period indicated by the sync frame period indication message is smaller than a specified sync frame period threshold;

the determination unit is configured to determine whether to accept the sync frame period indicated by the sync frame period indication message;

the sending unit is configured to send a reply message to the central office equipment in response to the sync frame period indication message received by the receiving unit, where the reply message is used to indicate whether the equipment accepts the sync frame period indicated by the sync frame period indication message; and the training unit is configured to, when the determination unit determines to accept the sync frame period indicated by the sync frame period indication message, perform vectoring training by using a corresponding sync frame within the accepted sync frame period.

In another aspect of the present invention, a network system is provided, where the network system includes the foregoing central office equipment and the foregoing customer premises equipment that are connected through a copper wire.

In another aspect of the present invention, a computer program product is provided, where the computer program product includes computer program codes, and when a computer unit executes the computer program codes, the computer unit executes the actions in the foregoing method for activating a DSL.

With the foregoing technical solutions, in the method, equipment, system, and computer program product according to the embodiments of the present invention, the length of an orthogonal sequence borne in a sync frame is not adjusted, and therefore a noise problem is not produced. Meanwhile, a sync frame period indication message is sent to a CPE, the sync frame period indication message indicates a sync frame period, and the sync frame period indicated by the sync frame period indication message is smaller than a specified sync frame period threshold. In this way, since a corresponding sync frame within the sync frame period indicated by the sync frame period indication message is used in vectoring training, the vectoring training is closely related to the sync frame period, and when the sync frame period decreases, the corresponding vectoring training time also decreases, so that the vectoring training time is shortened by changing the sync frame period, thereby shortening the activation time of a user.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following descriptions show merely some embodiments of the present invention, and persons of ordinary skill in the art may still derive other drawings from the accompanying drawings without creative efforts.

DETAILED DESCRIPTION OF THE EMBODIMENTS

The following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

To better understand the embodiments of the present invention, a DSL activation process is described briefly in the following. The DSL activation process may be divided into three stages: a handshake stage, a training stage, and a data stage.

The handshake stage is used for a central office (CO, Central Office) equipment and a customer premises equipment (Customer Premises Equipment, CPE) to negotiate a mode supported by the two ends, for example, an ADSL or VDSL2 mode.

The training stage is mainly used for calculating some features of a training channel, for example, calculating crosstalk noise between training channels and exchanging information required for both sides.

The data stage is used for exchanging service data, where channel training is also performed at an interval in the data stage but the interval of the channel training is long.

Figure 1:
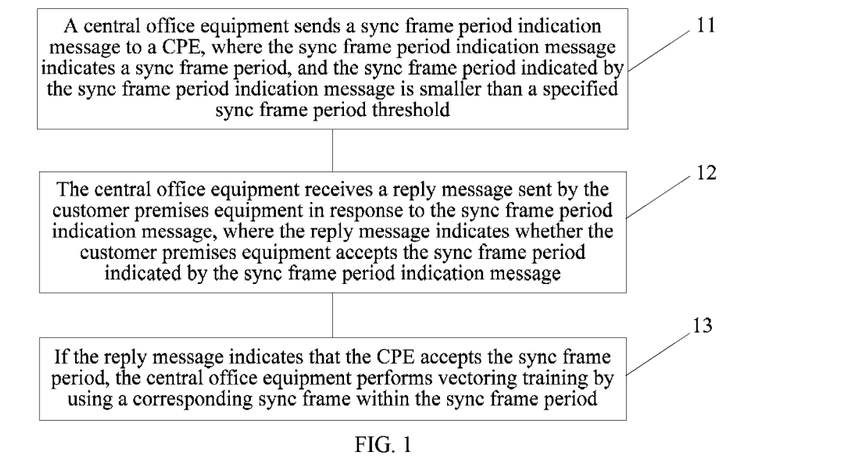
FIG. 1 is a flowchart of a method for activating a DSL according to an embodiment of the present invention.

An embodiment of the present invention provides a method for activating a DSL. The method may be executed by a central office equipment, and of course, may also be executed by another equipment between the central office equipment and a CPE. FIG. 1 is a flowchart of a method for activating a DSL according to an embodiment of the present invention. Referring to FIG. 1, the method is described based on the central office equipment and includes the following steps.

11: A central office equipment sends a sync frame period indication message to a CPE, where the sync frame period indication message indicates a sync frame period, and the sync frame period indicated by the sync frame period indication message is smaller than a specified sync frame period threshold.

In the embodiment of the present invention, the sync frame indication message may be any available message as long as the sync frame period can be transferred to the CPE, for example, the sync frame period is sent by extending an existing protocol. The central office equipment may send the sync frame period indication message to the CPE in the handshake stage, so as to directly use the sync frame period determined in the handshake stage to perform vectoring training in the follow-up training stage and data stage.

The specified sync frame period threshold may be any threshold conforming to a standard, for example, the sync frame period threshold is 256 in the G.993.2 standard. The sync frame period indicated by the sync frame period indication message may be any value smaller than 256, for example, 128, 64, or the like.

The indicating, by the sync frame period indication message, the sync frame period may include: indicating, by the sync frame period indication message, a sync frame period in at least one of the training stage and the data stage. Specifically, the sync frame period indication message may indicate sync frame periods in the training stage and the data stage, or the sync frame period indication message merely indicates a sync frame period in the training stage, or the sync frame period indication message merely indicates a sync frame period in the data stage.

After the central office equipment sends the sync frame period indication message to the CPE, the CPE responds to the received sync frame period indication message.

12: The central office equipment receives a reply message sent by the CPE in response to the sync frame period indication message, where the reply message is used to indicate whether the CPE accepts the sync frame period indicated by the sync frame period indication message. That is, the reply message is used to notify the central office equipment that the CPE accepts or does not accept the sync frame period indicated by the sync frame period indication message.

13: If the reply message indicates that the CPE accepts the sync frame period, the central office equipment performs vectoring training by using a corresponding sync frame within the sync frame period.

Specifically, the following several cases may be included.

① The sync frame period indication message merely indicates the sync frame period in the training stage, the reply message indicates accepting the sync frame period that is indicated by the sync frame period indication message and is in the training stage, and the performing, by the central office equipment, the vectoring training by using the corresponding sync frame within the sync frame period in step 13 includes: performing, by the central office equipment in the training stage, vectoring training by using a corresponding sync frame within the sync frame period in the training stage. In the follow-up data stage, the central office equipment may perform vectoring training by using a sync frame corresponding to the specified (existing) sync frame period threshold (for example, 256).

② The sync frame period indication message indicates a sync frame period in the data stage, the reply message indicates that the CPE accepts the sync frame period that is indicated by the sync frame period indication message and is in the data stage, and the performing, by the central office equipment, the vectoring training by using the corresponding sync frame within the sync frame period includes: performing, by the central office equipment in the data stage, vectoring training by using a corresponding sync frame within the sync frame period in the data stage. In the preceding training stage, the central office equipment may perform vectoring training by using a sync frame corresponding to the specified sync frame period threshold.

☐ The sync frame period indication message indicates sync frame periods in the training stage and the data stage, and the indicating, by the reply message, that the CPE accepts the sync frame period indicated by the sync frame period indication message may include: indicating, by the reply message, that the CPE accepts the sync frame periods that are indicated by the sync frame period indication message and are in the training stage and the data stage; indicating, by the reply message, that the CPE merely accepts the sync frame period that is indicated by the sync frame period indication message and is in the training stage; and indicating, by the reply message, that the CPE merely accepts the sync frame period that is indicated by the sync frame period indication message and is in the data stage. Details are as follows.

☐-1: when the reply message indicates that the CPE accepts the sync frame periods that are indicated by the sync frame period indication message and are in the training stage and the data stage, the performing, by the central office equipment, the vectoring training by using the corresponding sync frame within the sync frame period includes: performing, by the central office equipment in the training stage, vectoring training by using a corresponding sync frame within the sync frame period in the training stage, and performing, in the data stage, vectoring training by using a corresponding sync frame within the sync frame period in the data stage; or ☐-2: when the reply message indicates that the CPE merely accepts the sync frame period that is indicated by the sync frame period indication message and is in the training stage, the performing, by the central office equipment, the vectoring training by using the corresponding sync frame within the sync frame period includes: performing, by the central office equipment in the training stage, vectoring training by using a corresponding sync frame within the sync frame period in the training stage; or ☐-3: when the reply message indicates that the CPE merely accepts the sync frame period that is indicated by the sync frame period indication message and is in the data stage, the performing, by the central office equipment, the vectoring training by using the corresponding sync frame within the sync frame period includes: performing, by the central office equipment in the data stage, vectoring training by using a corresponding sync frame within the sync frame period in the data stage.

It should be noted that in the embodiment of the present invention, the sync frame periods that are indicated by the sync frame period indication messages and are in the training stage and the data stage may be the same or different, that is, it is designated that the sync frame periods in the training stage and the data stage may both be any values smaller than the specified sync frame period threshold.

In the embodiment of the present invention, the reply message may indicate that the CPE accepts the sync frame period indicated by the sync frame period indication message. Of course, the reply message may also indicate that the CPE does not accept the sync frame period indicated by the sync frame period indication message. When the reply message does not indicate that the CPE accepts the sync frame period indicated by the sync frame period indication message, the central office equipment performs vectoring training by using a sync frame corresponding to the specified sync frame period threshold.

In the method for activating a DSL according to the embodiment of the present invention, the length of an orthogonal sequence borne in a sync frame is not adjusted, and therefore a noise problem is not produced. Instead, a sync frame period indication message is sent to a CPE, the sync frame period indication message indicates a sync frame period, and the sync frame period indicated by the sync frame period indication message is smaller than a specified sync frame period threshold. Since the sync frame period indicated by the sync frame period indication message is used in vectoring training, when the sync frame period decreases, the corresponding vectoring training time also decreases, so that the vectoring training time is shortened by changing the sync frame period, thereby shortening the activation time of a user.

Figure 2:
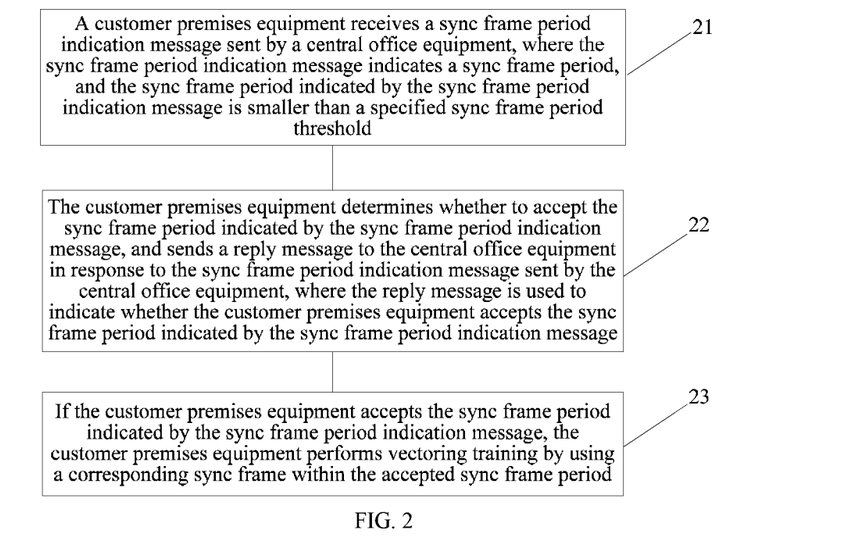
FIG. 2 is a flowchart of a method for activating a DSL according to an embodiment of the present invention.

Accordingly, an embodiment of the present invention provides a method for activating a DSL, the method may be executed by a CPE, and the CPE, for example, may be a modem or another similar apparatus. FIG. 2 is a flowchart of a method for activating a DSL according to an embodiment of the present invention. Referring to FIG. 2, the method is described based on the CPE and includes the following steps.

21: A CPE receives a sync frame period indication message sent by a central office equipment, where the sync frame period indication message indicates a sync frame period, and the sync frame period indicated by the sync frame period indication message is smaller than a specified sync frame period threshold.

22: The CPE determines whether to accept the sync frame period indicated by the sync frame period indication message, and sends a reply message to the central office equipment in response to the sync frame period indication message sent by the central office equipment, where the reply message is used to indicate whether the CPE accepts the sync frame period indicated by the sync frame period indication message.

Specifically, after receiving the sync frame period indication message, the CPE identifies the sync frame period indication message. If the CPE cannot identify the sync frame period indication message, it indicates that the CPE does not accept the sync frame period indicated by the sync frame period indication message. In this case, the CPE performs no processing on the sync frame period indication message, and performs vectoring training by using a sync frame corresponding to the specified sync frame period threshold during the vectoring training. On the contrary, if the CPE can identify the sync frame period indication message, it indicates that the CPE accepts the sync frame period indicated by the sync frame period indication message. In this case, the CPE parses the sync frame period indication message to obtain the sync frame period indicated by the sync frame period indication message.

23: If the CPE accepts the sync frame period indicated by the sync frame period indication message, the CPE performs vectoring training by using a corresponding sync frame within the accepted sync frame period.

The indicating, by the sync frame period indication message, the sync frame period may include: indicating, by the sync frame period indication message, a sync frame period in at least one of a training stage and a data stage.

When the sync frame period indication message indicates a sync frame period in the training stage, the performing, by the CPE, the vectoring training by using the corresponding sync frame within the accepted sync frame period in step 23 includes: performing, by the CPE in the training stage, vectoring training by using a corresponding sync frame within the accepted sync frame period in the training stage.

When the sync frame period indication message indicates a sync frame period in the data stage, the performing, by the CPE, the vectoring training by using the corresponding sync frame within the accepted sync frame period in step 23 includes: performing, by the CPE in the data stage, vectoring training by using a corresponding sync frame within the accepted sync frame period in the data stage.

When the sync frame period indication message indicates sync frame periods in the training stage and the data stage, the indicating, by the reply message, that the CPE accepts the sync frame period indicated by the sync frame period indication message may include: indicating, by the reply message, that the CPE accepts the sync frame periods that are indicated by the sync frame period indication message and are in the training stage and the data stage; indicating, by the reply message, that the CPE merely accepts the sync frame period that is indicated by the sync frame period indication message and is in the training stage; and indicating, by the reply message, that the CPE merely accepts the sync frame period that is indicated by the sync frame period indication message and is in the data stage.

When the reply message indicates that the CPE accepts the sync frame periods that are indicated by the sync frame period indication message and are in the training stage and the data stage, the performing, by the CPE, the vectoring training by using the corresponding sync frame within the accepted sync frame period in step 23 includes: performing, by the CPE in the training stage, vectoring training by using a corresponding sync frame within the accepted sync frame period in the training stage, and performing, in the data stage, vectoring training by using a corresponding sync frame within the accepted sync frame period in the data stage; or when the reply message indicates that the CPE merely accepts the sync frame period that is indicated by the sync frame period indication message and is in the training stage, the performing, by the CPE, the vectoring training by using the corresponding sync frame within the accepted sync frame period includes: performing, by the CPE in the training stage, vectoring training by using a corresponding sync frame within the accepted sync frame period in the training stage; or when the reply message indicates that the CPE merely accepts the sync frame period that is indicated by the sync frame period indication message and is in the data stage, the performing, by the CPE, the vectoring training by using the corresponding sync frame within the accepted sync frame period includes: performing, by the CPE in the data stage, vectoring training by using a corresponding sync frame within the accepted sync frame period in the data stage.

In the embodiment of the present invention, the reply message may indicate that the CPE accepts the sync frame period indicated by the sync frame period indication message. Of course, the reply message may also indicate that the CPE does not accept the sync frame period indicated by the sync frame period indication message. When the reply message does not indicate that the CPE accepts the sync frame period indicated by the sync frame period indication message, the central office equipment performs vectoring training by using a sync frame corresponding to the specified sync frame period threshold.

In the method for activating a DSL according to the embodiment of the present invention, the length of an orthogonal sequence borne in a sync frame is not adjusted, and therefore a noise problem is not produced. Instead, a sync frame period indication message is sent to a CPE, the sync frame period indication message indicates a sync frame period, and the sync frame period indicated by the sync frame period indication message is smaller than a specified sync frame period threshold. In this way, since the sync frame period indicated by the sync frame period indication message is used in vectoring training, when the sync frame period decreases, the corresponding vectoring training time also decreases, so that the vectoring training time is shortened by changing the sync frame period, thereby shortening the activation time of a user.

To better understand the present invention, the present invention is further described with a specific embodiment in the following. It should also be noted that the following embodiment is just part of the embodiments of the present invention, and other embodiments readily figured out by persons skilled in the art from the content of the present invention fall within the scope of the present invention.

Figure 3:
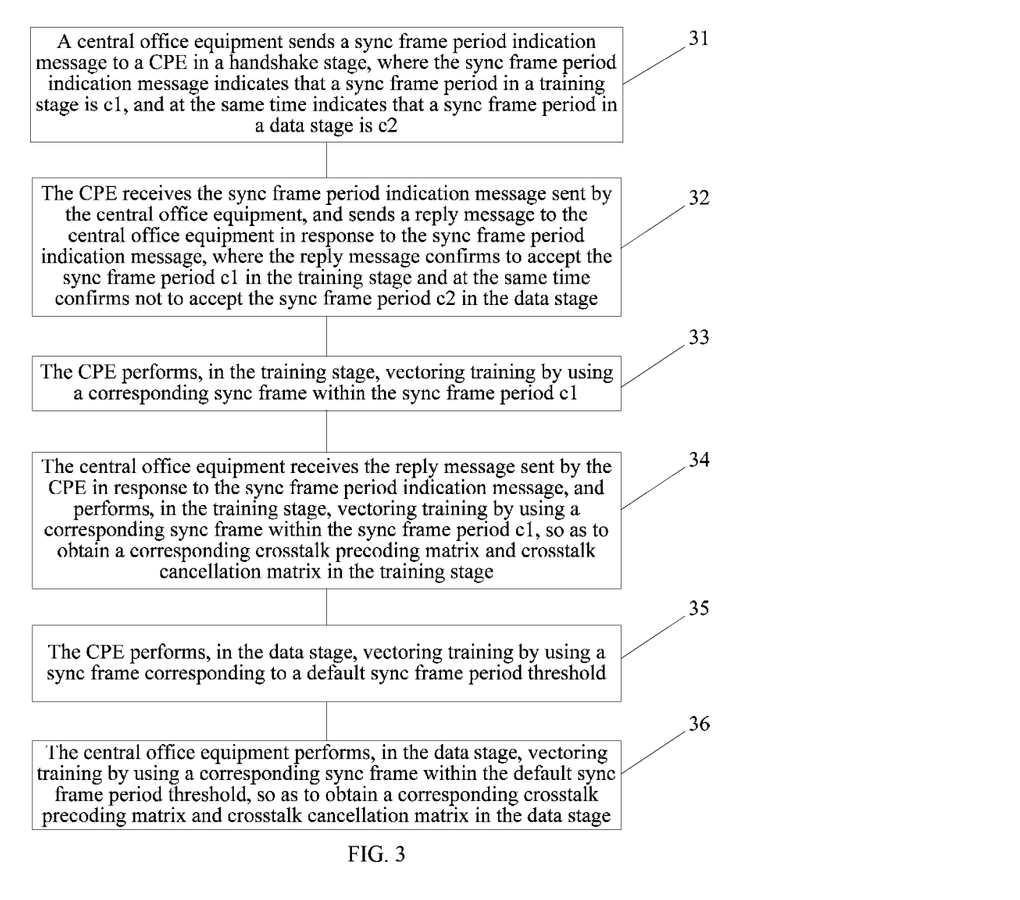
FIG. 3 is a specific flowchart of a method for activating a DSL according to an embodiment of the present invention.

FIG. 3 is a specific flowchart of a method for activating a DSL according to an embodiment of the present invention. Referring to FIG. 3, the method for activating a DSL according to this embodiment includes the following steps.

31: A central office equipment sends a sync frame period indication message to a CPE (for example, a modem) in a handshake stage, where the sync frame period indication message indicates that a sync frame period in a training stage is c1, and at the same time indicates that a sync frame period in a data stage is c2. The c1, for example, is 128, and the c2, for example, is 32.

32: The CPE receives the sync frame period indication message sent by the central office equipment, and sends a reply message to the central office equipment in response to the sync frame period indication message, where the reply message indicates that the CPE accepts the sync frame period c1 in the training stage and at the same time indicates that the CPE does not accept the sync frame period c2 in the data stage.

33: The CPE performs, in the training stage, vectoring training by using a corresponding sync frame within the sync frame period c1.

34: The central office equipment receives the reply message sent by the CPE in response to the sync frame period indication message, and performs, in the training stage, vectoring training by using a corresponding sync frame within the sync frame period c1, so as to obtain a corresponding crosstalk precoding matrix and crosstalk cancellation matrix in the training stage.

35: The CPE performs, in the data stage, vectoring training by using a corresponding sync frame within a default sync frame period threshold (for example, 256).

36: The central office equipment performs, in the data stage, vectoring training by using a corresponding sync frame within the default sync frame period threshold (for example, 256), so as to obtain a corresponding crosstalk precoding matrix and crosstalk cancellation matrix in the data stage.

In the follow-up process, an existing vectoring DSL technology can be used to eliminate crosstalk between different channels and finally activate the DSL.

In the method for activating a DSL according to this embodiment, a sync frame period indication message is sent to a CPE, the sync frame period indication message indicates a sync frame period, and the sync frame period indicated by the sync frame period indication message is smaller than a specified sync frame period threshold. In this way, since the sync frame period indicated by the sync frame period indication message is used in vectoring training, when the sync frame period decreases, the corresponding vectoring training time also decreases, so that the vectoring training time is shortened by changing the sync frame period, thereby shortening the activation time of a user.

Figure 4:
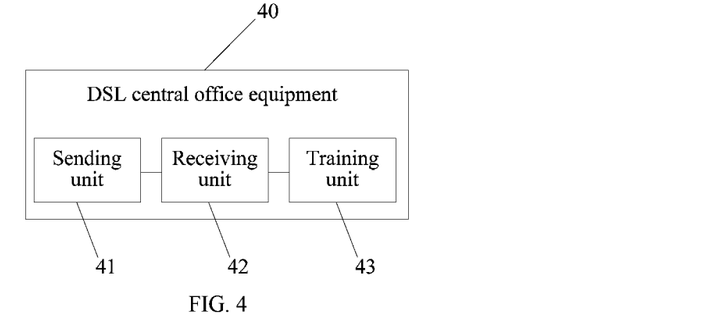
FIG. 4 is a structural block diagram of a DSL central office equipment according to an embodiment of the present invention.

Accordingly, an embodiment of the present invention further provides a DSL central office equipment 40. FIG. 4 is a structural block diagram of a DSL central office equipment according to an embodiment of the present invention. Referring to FIG. 4, the equipment 40 includes a sending unit 41, a receiving unit 42, and a training unit 43. The sending unit 41 may be a transmitter (transmitter) or a transceiver (transceiver); the receiving unit 42 may be a receiver (receiver) or a transceiver; and the training unit 43 may be a micro control unit MCU, a digital signal processor DSP, a microprocessor (microprocessor), a field programmable logic array FPGA, an application specific integrated circuit ASIC, or other similar equipments/modules.

The sending unit 41 is configured to send a sync frame period indication message to a CPE, where the sync frame period indication message indicates a sync frame period, and the sync frame period indicated by the sync frame period indication message is smaller than a specified sync frame period threshold.

The receiving unit 42 is configured to receive a reply message sent by the CPE in response to the sync frame period indication message sent by the sending unit 41, where the reply message is used to indicate whether the CPE accepts the sync frame period indicated by the sync frame period indication message.

The training unit 43 is configured to, when the reply message received by the receiving unit 42 indicates that the CPE accepts the sync frame period, perform vectoring training by using a corresponding sync frame within the sync frame period.

The indicating, by the sync frame period indication message, the sync frame period includes: indicating, by the sync frame period indication message, a sync frame period in at least one of a training stage and a data stage.

In an embodiment of the present invention, the sync frame period indication message indicates a sync frame period in the training stage, and the training unit 43 is configured to perform, in the training stage, vectoring training by using a corresponding sync frame within the sync frame period in the training stage.

In another embodiment of the present invention, the sync frame period indication message indicates a sync frame period in the data stage, and the training unit 43 is configured to perform, in the data stage, vectoring training by using a corresponding sync frame within the sync frame period in the data stage.

In another embodiment of the present invention, the sync frame period indication message indicates sync frame periods in the training stage and the data stage, and the indicating, by the reply message, that the CPE accepts the sync frame period indicated by the sync frame period indication message may include: indicating, by the reply message, that the CPE accepts the sync frame periods that are indicated by the sync frame period indication message and are in the training stage and the data stage; indicating, by the reply message, that the CPE merely accepts the sync frame period that is indicated by the sync frame period indication message and is in the training stage; and indicating, by the reply message, that the CPE merely accepts the sync frame period that is indicated by the sync frame period indication message and is in the data stage.

When the reply message indicates that the CPE accepts the sync frame periods that are indicated by the sync frame period indication message and are in the training stage and the data stage, the training unit 43 is configured to perform, in the training stage, vectoring training by using a corresponding sync frame within the sync frame period in the training stage, and perform, in the data stage, vectoring training by using a corresponding sync frame within the sync frame period in the data stage; or when the reply message indicates that the CPE merely accepts the sync frame period that is indicated by the sync frame period indication message and is in the training stage, the training unit 43 is configured to perform, in the training stage, vectoring training by using a corresponding sync frame within the sync frame period in the training stage; or when the reply message indicates that the CPE merely accepts the sync frame period that is indicated by the sync frame period indication message and is in the data stage, the training unit 43 is configured to perform, in the data stage, vectoring training by using a corresponding sync frame within the sync frame period in the data stage.

Furthermore, the training unit 43 is further configured to:

when the reply message does not indicate that the CPE accepts the sync frame period indicated by the sync frame period indication message, perform vectoring training by using a sync frame corresponding to the specified sync frame period threshold.

In the DSL equipment according to this embodiment, a sync frame period indication message is sent to a CPE, the sync frame period indication message indicates a sync frame period, and the sync frame period indicated by the sync frame period indication message is smaller than a specified sync frame period threshold. In this way, since the sync frame period indicated by the sync frame period indication message is used in vectoring training, when the sync frame period decreases, the corresponding vectoring training time also decreases, so that the vectoring training time is shortened by changing the sync frame period, thereby shortening the activation time of a user.

Figure 5:
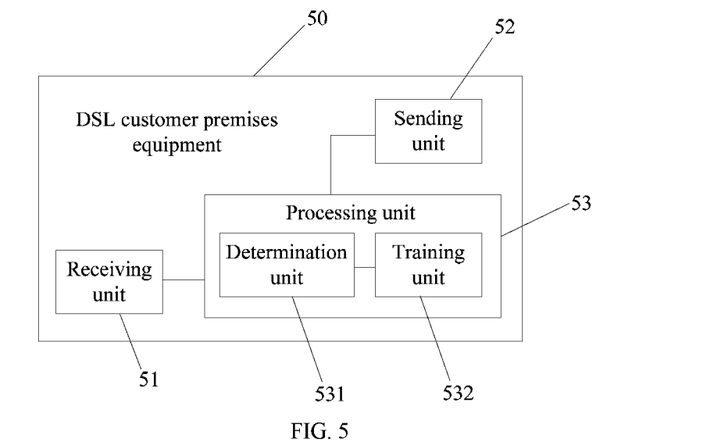
FIG. 5 is a structural block diagram of another DSL customer premises equipment according to an embodiment of the present invention.

Accordingly, an embodiment of the present invention further provides a DSL customer premises equipment 50, for example, a modem. FIG. 5 is a structural block diagram of a DSL customer premises equipment according to an embodiment of the present invention. Referring to FIG. 5, the equipment 50 includes a receiving unit 51, a sending unit 52, and a processing unit 53. The processing unit 53 includes a determination unit 531 and a training unit 532. The sending unit 52 may be a transmitter (transmitter), or a transceiver (transceiver), or a user side interface of a CPE, or other similar interfaces/modules; the receiving unit may be a receiver (receiver), or a transceiver, or a network side interface of the CPE, or other similar interfaces/modules; and the processing unit 53 may be a micro control unit MCU, a digital signal processor DSP, a microprocessor (microprocessor), a field programmable logic array FPGA, an application specific integrated circuit ASIC, or other similar equipments/modules.

The receiving unit 51 is configured to receive a sync frame period indication message sent by a central office equipment, where the sync frame period indication message indicates a sync frame period, and the sync frame period indicated by the sync frame period indication message is smaller than a specified sync frame period threshold.

The determination unit 531 is configured to determine whether to accept the sync frame period indicated by the sync frame period indication message.

The sending unit 52 is configured to send a reply message to the central office equipment in response to the sync frame period indication message received by the receiving unit 51, where the reply message is used to indicate whether the equipment 50 accepts the sync frame period indicated by the sync frame period indication message.

The training unit 532 is configured to, when the determination unit 531 determines to accept the sync frame period indicated by the sync frame period indication message, perform vectoring training by using a corresponding sync frame within the accepted sync frame period.

The indicating, by the sync frame period indication message, the sync frame period includes: indicating, by the sync frame period indication message, a sync frame period in at least one of a training stage and a data stage.

In an embodiment of the present invention, the sync frame period indication message indicates a sync frame period in the training stage, and the training unit 532 is configured to perform, in the training stage, vectoring training by using a corresponding sync frame within the accepted sync frame period in the training stage.

In another embodiment of the present invention, the sync frame period indication message indicates a sync frame period in the data stage, and the training unit 532 is configured to perform, in the data stage, vectoring training by using a corresponding sync frame within the accepted sync frame period in the data stage.

In another embodiment of the present invention, the sync frame period indication message indicates sync frame periods in the training stage and the data stage, and the determining, by the determination unit 531, to accept the sync frame period indicated by the sync frame period indication message includes: determining, by the determination unit 531, to accept the sync frame periods that are indicated by the sync frame period indication message and are in the training stage and the data stage; determining, by the determination unit 531, to merely accept the sync frame period that is indicated by the sync frame period indication message and is in the training stage; and determining, by the determination unit 531, to merely accept the sync frame period that is indicated by the sync frame period indication message and is in the data stage.

When the determination unit 531 determines to accept the sync frame periods that are indicated by the sync frame period indication message and are in the training stage and the data stage, the training unit 532 is configured to perform, in the training stage, vectoring training by using a corresponding sync frame within the accepted sync frame period in the training stage, and perform, in the data stage, vectoring training by using a corresponding sync frame within the accepted sync frame period in the data stage; or when the determination unit 531 determines to merely accept the sync frame period that is indicated by the sync frame period indication message and is in the training stage, the training unit 532 is configured to perform, in the training stage, vectoring training by using a corresponding sync frame within the accepted sync frame period in the training stage; or when the determination unit 531 determines to merely accept the sync frame period that is indicated by the sync frame period indication message and is in the data stage, the training unit 532 is configured to perform, in the data stage, vectoring training by using a corresponding sync frame within the accepted sync frame period in the data stage.

Furthermore, the training unit 532 is further configured to: when the determination unit 531 does not determine to accept the sync frame period indicated by the sync frame period indication message, perform vectoring training by using a sync frame corresponding to the specified sync frame period threshold.

In the equipment for activating a DSL according to this embodiment, a sync frame period indication message is sent to a CPE, the sync frame period indication message indicates a sync frame period, and the sync frame period indicated by the sync frame period indication message is smaller than a specified sync frame period threshold. In this way, since the sync frame period indicated by the sync frame period indication message is used in vectoring training, when the sync frame period decreases, the corresponding vectoring training time also decreases, so that the vectoring training time is shortened by changing the sync frame period, thereby shortening the activation time of a user.

It should be noted that the DSL equipment according to the embodiment of the present invention corresponds to the foregoing method for activating a DSL, and the DSL central office equipment and the DSL customer premises equipment according to the embodiments of the present invention are used to execute the foregoing methods for activating a DSL. Since related content is described in the embodiments of the methods for activating a DSL, the details are not described herein again and reference may be made to the embodiments of the methods for activating a DSL.

In addition, it should be noted that, the units included in the embodiments of the DSL central office equipment and the DSL customer premises equipment are divided just according to functional logic, but the present invention is not limited to the division, as long as corresponding functions can be implemented; and specific names of the functional units are merely provided for the purpose of distinguishing the units from one another, but not intended to limit the protection scope of the present invention.

Figure 6:
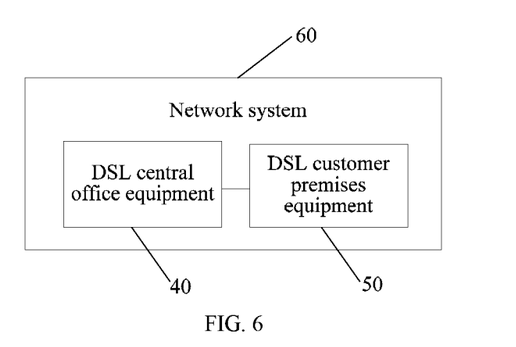
FIG. 6 is a structural block diagram of a network system according to an embodiment of the present invention.

In addition, as shown in FIG. 6, an embodiment of the present invention further provides a network system 60. The network system includes the DSL central office equipment 40 according to an embodiment of the present invention and the DSL customer premises equipment 50 according to an embodiment of the present invention. The DSL central office equipment 40 and the DSL customer premises equipment 50 are connected through a copper wire, and the structural composition and connection of a DSL network are the same as those in the prior art. Since the DSL central office equipment 40 and the DSL customer premises equipment 50 are described in detail in the preceding text, the details are not described herein again.

In addition, an embodiment of the present invention further provides a computer program product, where the computer program product includes computer program codes, and when a computer unit executes the computer program codes, the computer unit executes the actions in each embodiment of the foregoing method for activating a DSL.

Persons of ordinary skill in the art may understand that all or a part of the steps of the method in the embodiments of the present invention may be implemented by a program instructing relevant hardware. The program may be stored in a computer readable storage medium, such as a read only memory, a magnetic disk or an optical disk.

The foregoing description is merely about the specific implementation of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for activating a digital subscriber line, comprising:
    sending, by a central office equipment, a sync frame period indication message to a customer premises equipment, wherein the sync frame period indication message indicates a sync frame period in at least one of a training stage and a data stage, and the sync frame period indicated by the sync frame period indication message is smaller than a specified sync frame period threshold;
    receiving, by the central office equipment, a reply message sent by the customer premises equipment in response to the sync frame period indication message, wherein the reply message indicates whether the customer premises equipment accepts the sync frame period indicated by the sync frame period indication message; and
    when the reply message indicates that the customer premises equipment accepts the sync frame period, performing, by the central office equipment, vectoring training by using a corresponding sync frame within the sync frame period; and when the reply message does not indicate that the customer premises equipment accepts the sync frame period, performing, by the central office equipment, vectoring training by using a sync frame corresponding to the specified sync frame period threshold.

2. The method according to claim 1, wherein the sync frame period indication message indicates the sync frame period in at least one of a training stage and a data stage.

3. The method according to claim 1, wherein the sync frame period indication message indicates a first sync frame period in a training stage, and
    the performing, by the central office equipment, the vectoring training by using the corresponding sync frame within the sync frame period comprises:
    performing, by the central office equipment in the training stage, first vectoring training by using a first corresponding sync frame within the first sync frame period in the training stage.

4. The method according to claim 1, wherein the sync frame period indication message indicates a second sync frame period in a data stage, and
    the performing, by the central office equipment, the vectoring training by using the corresponding sync frame within the sync frame period comprises:
    performing, by the central office equipment in the data stage, second vectoring training by using a second corresponding sync frame within the second sync frame period in the data stage.

5. The method according to claim 1, wherein the sync frame period indication message indicates sync frame periods in the training stage and the data stage, and the indicating, by the reply message, that the customer premises equipment accepts the sync frame period indicated by the sync frame period indication message comprises:
    indicating, by the reply message, that the customer premises equipment accepts the sync frame periods that are indicated by the sync frame period indication message and are in the training stage and the data stage; indicating, by the reply message, that the customer premises equipment only accepts a first sync frame period that is indicated by the sync frame period indication message and is in the training stage; and indicating, by the reply message, that the customer premises equipment only accepts a second sync frame period that is indicated by the sync frame period indication message and is in the data stage;
    when the reply message indicates that the customer premises equipment accepts the sync frame periods that are indicated by the sync frame period indication message and are in the training stage and the data stage, the performing, by the central office equipment, the vectoring training by using the corresponding sync frame within the sync frame period comprises:
        performing, by the central office equipment in the training stage, first vectoring training by using a first corresponding sync frame within the first sync frame period in the training stage, and performing, in the data stage, second vectoring training by using a second corresponding sync frame within the second sync frame period in the data stage;
    when the reply message indicates that the customer premises equipment only accepts the sync frame period that is indicated by the sync frame period indication message and is in the training stage, the performing, by the central office equipment, the vectoring training by using the corresponding sync frame within the sync frame period comprises:
        performing, by the central office equipment in the training stage, the first vectoring training by using the first corresponding sync frame within the first sync frame period in the training stage;
    when the reply message indicates that the customer premises equipment only accepts the sync frame period that is indicated by the sync frame period indication message and is in the data stage, the performing, by the central office equipment, the vectoring training by using the corresponding sync frame within the sync frame period comprises:
        performing, by the central office equipment in the data stage, the second vectoring training by using the second corresponding sync frame within the second sync frame period in the data stage.

6. A digital subscriber line central office equipment, comprising:
    a sending unit, configured to send a sync frame period indication message to a customer premises equipment, wherein the sync frame period indication message indicates a sync frame period in at least one of a training stage and a data stage, and the sync frame period indicated by the sync frame period indication message is smaller than a specified sync frame period threshold;

a receiving unit, configured to receive a reply message sent by the customer premises equipment in response to the sync frame period indication message sent by the sending unit, wherein the reply message is used to indicate whether the customer premises equipment accepts the sync frame period indicated by the sync frame period indication message; and a training unit, configured to, when the reply message received by the receiving unit indicates that the customer premises equipment accepts the sync frame period, perform vectoring training by using a corresponding sync frame within the sync frame period, and when the reply message does not indicate that the customer premises equipment accepts the sync frame period, perform vectoring training by using a sync frame corresponding to the specified sync frame period threshold.

7. The equipment according to claim 6, wherein the sync frame period indication message indicates the sync frame period in at least one of a training stage and a data stage.

8. The equipment according to claim 6, wherein the sync frame period indication message indicates a first sync frame period in a training stage, and the training unit is configured to perform, in the training stage, first vectoring training by using a first corresponding sync frame within the first sync frame period in the training stage.

9. The equipment according to claim 6, wherein the sync frame period indication message indicates a second sync frame period in a data stage, and the training unit is configured to perform, in the data stage, second vectoring training by using a second corresponding sync frame within the second sync frame period in the data stage.

10. The equipment according to claim 6, wherein the sync frame period indication message indicates sync frame periods in the training stage and the data stage, and the indicating, by the reply message, that the customer premises equipment accepts the sync frame period indicated by the sync frame period indication message comprises:

indicating, by the reply message, that the customer premises equipment accepts the sync frame periods that are indicated by the sync frame period indication message and are in the training stage and the data stage; indicating, by the reply message, that the customer premises equipment only accepts a first sync frame period that is indicated by the sync frame period indication message and is in the training stage; and indicating, by the reply message, that the customer premises equipment only accepts a second sync frame period that is indicated by the sync frame period indication message and is in the data stage;

when the reply message indicates that the customer premises equipment accepts the sync frame periods that are indicated by the sync frame period indication message and are in the training stage and the data stage, the training unit is configured to perform, in the training stage, first vectoring training by using a first corresponding sync frame within the first sync frame period in the training stage, and perform, in the data stage, second vectoring training by using a second corresponding sync frame within the second sync frame period in the data stage;

when the reply message indicates that the customer premises equipment only accepts the sync frame period that is indicated by the sync frame period indication message and is in the training stage, the training unit is configured to perform, in the training stage, the first vectoring training by using the first corresponding sync frame within the first sync frame period in the training stage; and when the reply message indicates that the customer premises equipment only accepts the sync frame period that is indicated by the sync frame period indication message and is in the data stage, the training unit is configured to perform, in the data stage, the second vectoring training by using the second corresponding sync frame within the second sync frame period in the data stage.

11. A network system, comprising a digital subscriber line central office equipment and a digital subscriber line customer premises equipment, wherein the digital subscriber line central office equipment and the digital subscriber line customer premises equipment are connected through a copper wire, and the digital subscriber line central office equipment is the digital subscriber line central office equipment, and the digital subscriber line customer premises equipment is the digital subscriber line customer premises equipment;

wherein the digital subscriber line central office equipment comprises:

a first sending unit, configured to send a sync frame period indication message to a customer premises equipment, wherein the sync frame period indication message indicates a sync frame period, and the sync frame period indicated by the sync frame period indication message is smaller than a specified sync frame period threshold;

a receiving unit, configured to receive a first reply message sent by the customer premises equipment in response to the sync frame period indication message sent by the sending unit, wherein the first reply message is used to indicate whether the customer premises equipment accepts the sync frame period indicated by the sync frame period indication message; and a first training unit, configured to, when the reply message received by the receiving unit indicates that the customer premises equipment accepts the sync frame period, perform vectoring training by using a corresponding sync frame within the sync frame period; and wherein the digital subscriber line customer premises equipment, comprising a receiving unit, a processing unit, and a second sending unit, wherein the processing unit comprises a determination unit and a second training unit, wherein the receiving unit is configured to receive the sync frame period indication message sent by the digital subscriber line central office equipment;

the determination unit is configured to determine whether to accept the sync frame period indicated by the sync frame period indication message;

the sending unit is configured to send a second reply message to the digital subscriber line central office equipment in response to the sync frame period indication message received by the receiving unit, wherein the second reply message is used to indicate whether the equipment accepts the sync frame period indicated by the sync frame period indication message; and the second training unit is configured to, when the determination unit determines to accept the sync frame period indicated by the sync frame period indication message, perform vectoring training by using a corresponding sync frame within the accepted sync frame period.

12. A non-statutory computer program product, comprising computer program codes, when executed by a hardware processor cause the hardware processor to execute the following steps:
- sending a sync frame period indication message to a customer premises equipment, wherein the sync frame period indication message indicates a sync frame period, and the sync frame period indicated by the sync frame period indication message is smaller than a specified sync frame period threshold;
- receiving a reply message sent by the customer premises equipment in response to the sync frame period indication message, wherein the reply message indicates whether the customer premises equipment accepts the sync frame period indicated by the sync frame period indication message; and
- when the reply message indicates that the customer premises equipment accepts the sync frame period, performing vectoring training by using a corresponding sync frame within the sync frame period; and when the reply message does not indicate that the customer premises equipment accepts the sync frame period, performing vectoring training by using a sync frame corresponding to the specified sync frame period threshold.

\* \* \* \* \*